(No Model.)
W. BIDDLE.
MEANS FOR DRIVING DYNAMOS FROM CAR AXLES.
No. 526,432. Patented Sept. 25, 1894.
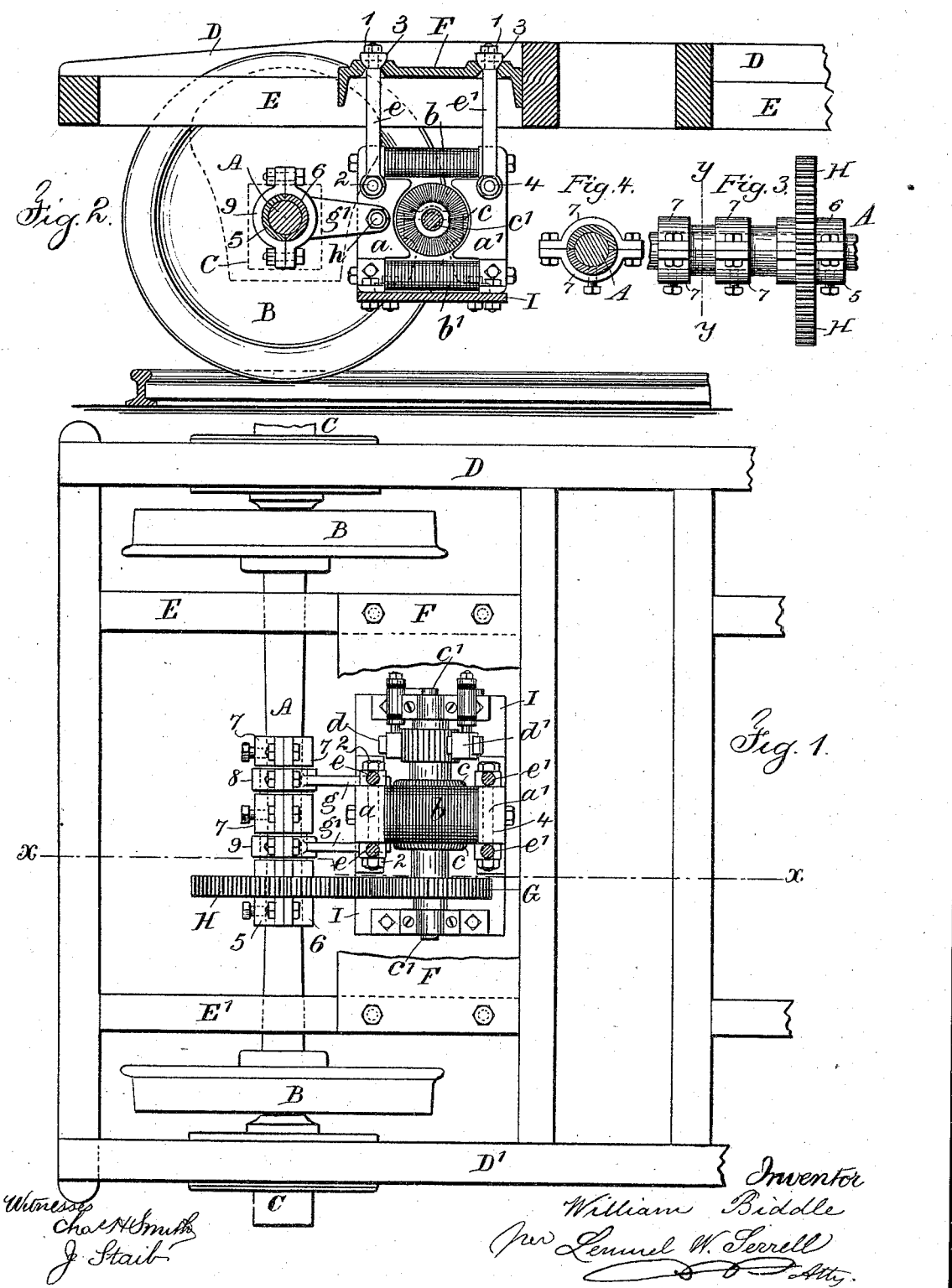

UNITED STATES PATENT OFFICE.

WILLIAM BIDDLE, OF BROOKLYN, ASSIGNOR TO THE AMERICAN RAILWAY ELECTRIC LIGHT COMPANY, OF NEW YORK, N. Y.

MEANS FOR DRIVING DYNAMOS FROM CAR-AXLES.

SPECIFICATION forming part of Letters Patent No. 526,432, dated September 25, 1894.

Application filed October 20, 1893. Serial No. 488,665. (No model.)

*To all whom it may concern:*

Be it known that I, WILLIAM BIDDLE, a citizen of the United States, residing at Brooklyn, in the county of Kings and State of New York, have invented an Improvement in Electric-Car-Lighting Apparatus, of which the following is a specification.

My invention relates to electric lighting for railway cars wherein a dynamo is operated by gearing from the car axle, the dynamo being supported upon the truck and furnishing electric current to a storage battery, from which battery the current is taken to the incandescent lamps, and my present invention relates particularly to the manner of supporting the dynamo from the car truck and maintaining said dynamo in a constant relation to the car axle in order that the operative contact of the driving wheel and pinion may remain intact.

In carrying out my invention I provide a transverse plate or girder resting upon, supported by and connected to the truck frame, and I provide links in pairs depending from said transverse plate or girder, the lower ends of which links are connected by bolts to the opposite sides of the pole pieces of the dynamo, and I prefer to form sockets in the upper face of the transverse plate or girder and cup-shaped bearers upon the upper ends of said links resting in said sockets, said cup-shaped bearers being secured upon the upper ends of the links by the nuts. The dynamo thus supported has a slight freedom of movement to compensate for vibration and jar of the car truck, and I provide links formed with rings at one end to surround a sleeve upon the car axle, the other ends of the links being connected by a bolt to one of the pole pieces of the dynamo, thus holding said dynamo at a constant and unvarying distance from the car axle so that there is no liability of the gear wheel and pinion being disengaged.

In the drawings, Figure 1 is a sectional plan view of the truck, dynamo and its connections to the car axle, and Fig. 2 is a vertical section of the same at the line $x, x$ of Fig. 1. Fig. 3 is a plan view of the half sleeves and wheel upon the axle, and Fig. 4 is a cross section at $y, y$, of Fig. 3.

The car axle is shown at A, the wheels at B, their bearing boxes at C, and D D' represent the wheel pieces of the truck which come above the bearing boxes, and E E' represent the safety beams parallel with the wheel pieces D D' and inside of the same in the formation of the truck frame, and F represents the transverse plate or girder. This transverse plate or girder F is shown as extending across from the safety beams E E' and is bolted thereto. This transverse plate or girder however might be continued across and in part curved over the wheels B to rest upon and be connected to the wheel pieces D D' as well as to the safety beams aforesaid.

The dynamo is mounted upon a base plate I by preference, the same being secured to the under side of the pole pieces $a\ a'$ and supporting the bearings for the armature $c$ and its shaft $c'$.

The transverse plate or girder F is perforated at four places for the pairs of links $e\ e'$ and at the perforations in the transverse plate or girder I prefer to make raised portions with sockets, as shown in the section Fig. 2, and the pairs of links $e\ e'$ that pass through said perforations are at their upper ends provided with cup-shaped bearers 3 resting in said sockets and securely held by the end nuts 1 upon said suspending links. The lower ends of the pairs of suspending links $e\ e'$ are made with eyes through which and the pole pieces $a\ a'$ pass bolts 2, 4. These bolts 2, 4 may if desired be insulated in the pole pieces or the cup-shaped bearers 3 may be insulated in the sockets of the transverse plate or girder F, these pairs of links $e\ e'$ serving to support the pole pieces $a\ a'$, their magnets $b\ b'$, the base plate I, the armature, its shaft and bearings, the center of the armature shaft being on a line horizontally with the car axle, and commutator brushes $d\ d'$ are employed as usual.

Upon the armature shaft $c'$ is a pinion G and upon the car axle A is an engaging wheel H. These are by preference toothed wheels, but I do not limit myself in this respect. The engaging wheel H is made in two pieces with half sleeves that extend along the axle. These half sleeves I provide with two circumferential grooves between the half hubs 5, 6 at the wheel H and the center and end collar 7 and bolts pass through these parts to secure the wheel and half sleeves to the axle. These grooves receive the rings 8, 9 and are wide enough to provide a slight longitudinal movement of the rings along the sleeve.

Links $g\ g'$ are at one end formed with half of the rings 8, 9, the halves of the rings being bolted together around the half sleeves upon the axle, and the other ends of the links $g\ g'$ are provided with eyes through which and through a hole in one pole piece $a$ passes a connecting bolt $h$. This bolt $h$ may if desired be insulated in the pole piece $a$.

The links $g\ g'$ connect the dynamo directly to the axle and maintain a constant distance between the dynamo and car axle so that there can be no movement to draw the dynamo away from the axle, and where the rings 8, 9 surround the half sleeves upon the axle, there is sufficient looseness between the hubs and collars of said half sleeves to allow for a slight longitudinal movement of the car axle, and this looseness also allows for any slight swaying movement laterally that there may be in the dynamo as suspended by the pairs of links $e\ e'$ from the transverse plate or girder F.

My improvements comprise a simple and efficient manner of suspending the dynamo from a car truck and provide for a slight yielding or movement that is adapted to lessen any damage that might come to the dynamo from the vibration or hammering action of the truck and wheels and at the same time a positive connection is maintained between the car axle and dynamo so that there can be no separation of the devices that communicate rotation from the car axle to the armature shaft of the dynamo.

I claim as my invention—

1. The combination with a car axle, car truck and a dynamo, of a transverse plate or girder connected to and supported by the frame of the truck, the pairs of suspending links, the upper ends of which pass through and are supported by the transverse plate or girder, bolts connecting the lower ends of said links to the pole pieces of the dynamo, and a connection from the car axle to one pole piece of the dynamo, whereby a constant distance is maintained between the car axle and dynamo, substantially as set forth.

2. The combination with a car axle, a car truck and a dynamo, of a transverse plate or girder connected to and supported by said truck and provided with openings therein, pairs of suspending links, $e\ e'$ passing through the openings in said plate and supported thereby and connected at their lower ends by bolts to the pole pieces of the dynamo, links $g\ g'$ provided at one end with rings surrounding the car axle and at the other end with a bolt which passes through and secures said links to one pole piece of the dynamo, substantially as set forth.

3. The combination with a car axle, a car truck and a dynamo, of the transverse plate or girder having openings therein and sockets, the pairs of suspending links $e\ e'$, cup-shaped bearers 3 at the upper ends of said links and resting in the sockets of the plate F, and nuts 1 for securing the cup-shaped bearers to the links, eyes at the lower ends of said links and bolts 2, 4, passing through said eyes and through the pole pieces of the dynamo, whereby the dynamo is flexibly supported by the plate F, substantially as set forth.

4. The combination with a car axle, a car truck and a dynamo, of the transverse plate or girder having openings therein and sockets, the pairs of suspending links $e\ e'$, cup-shaped bearers 3 at the upper ends of said links and resting in the sockets of the plate F, and nuts 1 for securing the cup-shaped bearers 3 to the links, eyes at the lower ends of said links and bolts 2, 4, passing through said eyes and through the pole pieces of the dynamo, whereby the dynamo is flexibly supported by the plate F, the links $g\ g'$, their rings 8, 9 surrounding the car axle and the bolt $h$ at the other ends of said links passing through one pole piece of the dynamo for maintaining the distance of the dynamo from the car axle constant, substantially as set forth.

Signed by me this 16th day of October, 1893.

WILLIAM BIDDLE.

Witnesses:
 GEO. T. PINCKNEY,
 A. M. OLIVER.